(12) United States Patent
Haag et al.

(10) Patent No.: US 12,184,551 B2
(45) Date of Patent: Dec. 31, 2024

(54) OPERATION OF A BROADBAND ACCESS NETWORK OF A TELECOMMUNICATIONS NETWORK

(71) Applicant: Deutsche Telekom AG, Bonn (DE)

(72) Inventors: Thomas Haag, Rodgau (DE);
Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 178 days.

(21) Appl. No.: 17/186,013

(22) Filed: Feb. 26, 2021

(65) Prior Publication Data
US 2021/0273885 A1 Sep. 2, 2021

(30) Foreign Application Priority Data
Feb. 28, 2020 (EP) .................................. 20 160 217

(51) Int. Cl.
*H04L 47/12* (2022.01)
*H04L 12/10* (2006.01)
*H04L 49/253* (2022.01)

(52) U.S. Cl.
CPC .............. *H04L 47/12* (2013.01); *H04L 12/10* (2013.01); *H04L 49/253* (2013.01)

(58) Field of Classification Search
None
See application file for complete search history.

(56) References Cited

U.S. PATENT DOCUMENTS

| 9,912,595 | B1 * | 3/2018 | Ramasamy ........... H04L 47/122 |
| 10,432,628 | B2 | 10/2019 | Edsall et al. | |

(Continued)

FOREIGN PATENT DOCUMENTS

| CN | 102667663 A | 9/2012 |
| CN | 104994246 A | 10/2015 |

(Continued)

OTHER PUBLICATIONS

Xie, Renchao et al., "Survey on computation offloading in mobile edge computing," Journal on Communications vol. 39, No. 11, China, Nov. 2018, pp. 138-155.

(Continued)

*Primary Examiner* — Huy D Vu
*Assistant Examiner* — Bao G Nguyen
(74) *Attorney, Agent, or Firm* — LEYDIG, VOIT & MAYER, LTD.

(57) ABSTRACT

A method for operation of a broadband access network of a telecommunications network includes: in a first step, a traffic load information message regarding the current load situation of a first leaf network node is transmitted, by the local power management entity or functionality of the first leaf network node, to a central power management entity or functionality; in a second step, the central power management entity or functionality transmits a session transfer request message to a session management entity or functionality; in a third step, the session management entity or functionality transmits a session transfer answer message to the central power management entity or functionality; and in a fourth step, the central power management entity or functionality transmits a traffic load execution message to the local power management entity or functionality of the first leaf network node.

17 Claims, 4 Drawing Sheets

100 telecommunications network
110 central office point of delivery
115 switching fabric
120 access network
50 customer premises equipment device
50' customer premises equipment device
51 client device
52 client device

(56) References Cited

U.S. PATENT DOCUMENTS

| | | | |
|---|---|---|---|
| 10,750,433 B1* | 8/2020 | Shukla | H04W 48/10 |
| 2009/0003585 A1* | 1/2009 | Chen | H04L 65/1096 |
| | | | 379/268 |
| 2010/0085884 A1 | 4/2010 | Srinivasan et al. | |
| 2012/0084356 A1* | 4/2012 | Ferdi | H04L 65/1016 |
| | | | 709/204 |
| 2012/0281577 A1 | 11/2012 | Winter et al. | |
| 2014/0233938 A1* | 8/2014 | Kiess | H04J 14/0287 |
| | | | 398/2 |
| 2014/0362750 A1* | 12/2014 | Song | H04W 52/0206 |
| | | | 370/311 |
| 2016/0352597 A1* | 12/2016 | Mekkattuparamban | |
| | | | H04W 76/34 |
| 2017/0006499 A1 | 1/2017 | Hampel et al. | |
| 2017/0026461 A1* | 1/2017 | Boutros | H04L 45/125 |
| 2018/0176145 A1* | 6/2018 | Sharma | H04L 47/25 |
| 2018/0192327 A1 | 7/2018 | Gaydos et al. | |
| 2019/0342206 A1 | 11/2019 | Michel et al. | |
| 2020/0014763 A1 | 1/2020 | Boon et al. | |
| 2020/0154336 A1* | 5/2020 | Islam | H04B 17/373 |
| 2020/0177629 A1* | 6/2020 | Hooda | H04L 47/125 |
| 2021/0076326 A1* | 3/2021 | Akl | H04W 52/0229 |

FOREIGN PATENT DOCUMENTS

| | | |
|---|---|---|
| CN | 107736004 A | 2/2018 |
| CN | 110199504 A | 9/2019 |
| KR | 20150077030 A | 7/2015 |
| WO | WO 2011016013 A2 | 2/2011 |

OTHER PUBLICATIONS

Tao Hu et al., "A Distributed Decision Mechanism for Controller Load Balancing Based on Switch Migration in SDN," China Communications, China, Oct. 2018, pp. 1-16.

* cited by examiner 100 telecommunications network
110 central office point of delivery
115 switching fabric
120 access network
50 customer premises equipment device
50' customer premises equipment device
51 client device
52 client device

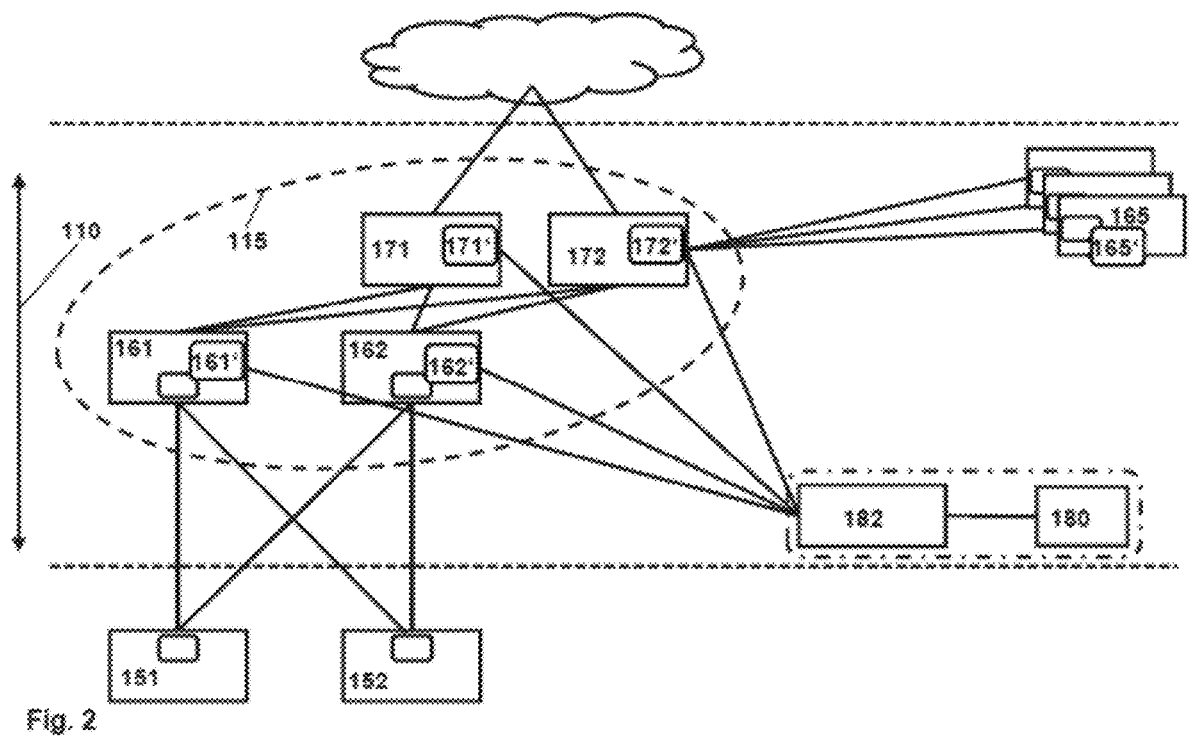

Fig. 2

110 central office point of delivery
115 switching fabric
151 access node
152 access node
161 leaf network node
161' local power management entity or functionality
162 leaf network node
162' local power management entity or functionality
165 server or Kubernetes Master and Worker entity
165' local power management entity or functionality
171 spine network node
171' local power management entity or functionality
172 spine network node
172' local power management entity or functionality
180 central power management entity or functionality
182 central management switch

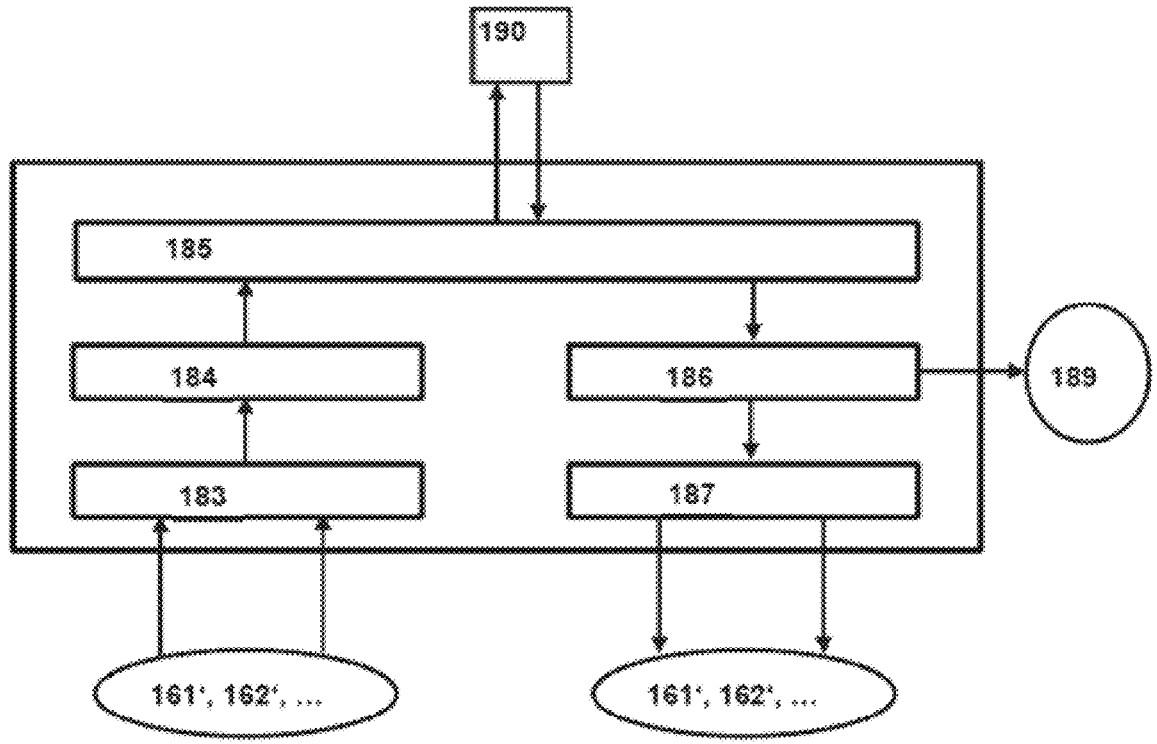

Fig. 3

161' local power management entity or functionality
162' local power management entity or functionality
183 load information collection entity or part
184 processing entity or part
185 central office point of delivery resource control and/or decision entity or part
186 network and service preparation entity or part
187 execution entity or part
189 software defined network controller
190 session management entity or functionality 161' local power management entity or functionality
161" load detection functionality
180 central power management entity or functionality
190 session management entity or functionality
201 first processing step
202 second processing step
203 third processing step
204 fourth processing step
205 fifth processing step

OPERATION OF A BROADBAND ACCESS NETWORK OF A TELECOMMUNICATIONS NETWORK

CROSS-REFERENCE TO PRIOR APPLICATIONS

Priority is claimed to European Patent Application No. EP 20 160 217.4, filed on Feb. 28, 2020, the entire disclosure of which is hereby incorporated by reference herein.

FIELD

The present invention relates a method for improved operation of a broadband access network of a telecommunications network and/or for improved and/or more energy efficient operation of the broadband access network, the broadband access network comprising a central office point of delivery with a switching fabric, the switching fabric comprising a plurality of spine network nodes and a plurality of leaf network nodes.

Furthermore, the present invention relates to a broadband access network or telecommunications network for improved operation of the broadband access network and/or for improved and/or more energy efficient operation of the broadband access network, the broadband access network comprising a central office point of delivery with a switching fabric.

Additionally, the present invention relates to a spine network node or leaf network node or central power management entity or functionality or session management entity or functionality, for improved operation of a broadband access network of a telecommunications network and/or for improved and/or more energy efficient operation of the broadband access network or the telecommunications network.

Additionally, the present invention relates to a system for improved operation of a broadband access network and/or for improved and/or more energy efficient operation of the broadband access network, the broadband access network comprising a central office point of delivery with a switching fabric, the switching fabric comprising a plurality of spine network nodes and a plurality of leaf network nodes.

Furthermore, the present invention relates to a program and a computer-readable medium for improved operation of a broadband access network and/or for improved and/or more energy efficient operation of the broadband access network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current central office point of delivery design architecture(s), power management is typically not at the focus of architectural design decisions or scope. Hence, there is a need for efficient power management for such central office point of delivery design architecture(s), preferably dependent on traffic and load conditions.

SUMMARY

In an exemplary embodiment, the present invention provides a method for operation of a broadband access network of a telecommunications network. The broadband access network comprises a central office point of delivery with a switching fabric, the switching fabric comprising a plurality of spine network nodes and a plurality of leaf network nodes. The central office point of delivery and/or the broadband access network comprises a central power management entity or functionality and a session management entity or functionality. The plurality of spine network nodes and the plurality of leaf network nodes comprise, respectively, a local power management entity or functionality. The method comprises: in a first step, a traffic load information message regarding the current load situation of a first leaf network node of the plurality of leaf network nodes is transmitted, by the local power management entity or functionality of the first leaf network node, to the central power management entity or functionality; in a second step, subsequent to the first step, the central power management entity or functionality transmits a session transfer request message to the session management entity or functionality, the session transfer request message corresponding to requesting permission to carry over one or a plurality of sessions handled by the first leaf network node to a second leaf network node of the plurality of leaf network nodes; in a third step, subsequent to the second step, the session management entity or functionality transmits a session transfer answer message to the central power management entity or functionality, the session transfer answer message corresponding to the session transfer request message; and in a fourth step, subsequent to the third step, the central power management entity or functionality transmits a traffic load execution message to the local power management entity or functionality of the first leaf network node, wherein, based on the content of the traffic load execution message, the first leaf network node is controlled for improved and/or more energy efficient operation.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 2 schematically shows in greater detail the central office point of delivery comprising a certain number of components, entities and/or network nodes, as well as further entities and/or network nodes being connected to the central office point of delivery.

FIGS. 3 and 4 schematically illustrate a block or flow diagram (FIG. 3) and a communication diagram (FIG. 4) implementing the control of the respective entity or network node, especially a considered leaf network node or spine network node.

DETAILED DESCRIPTION

Figure 1:
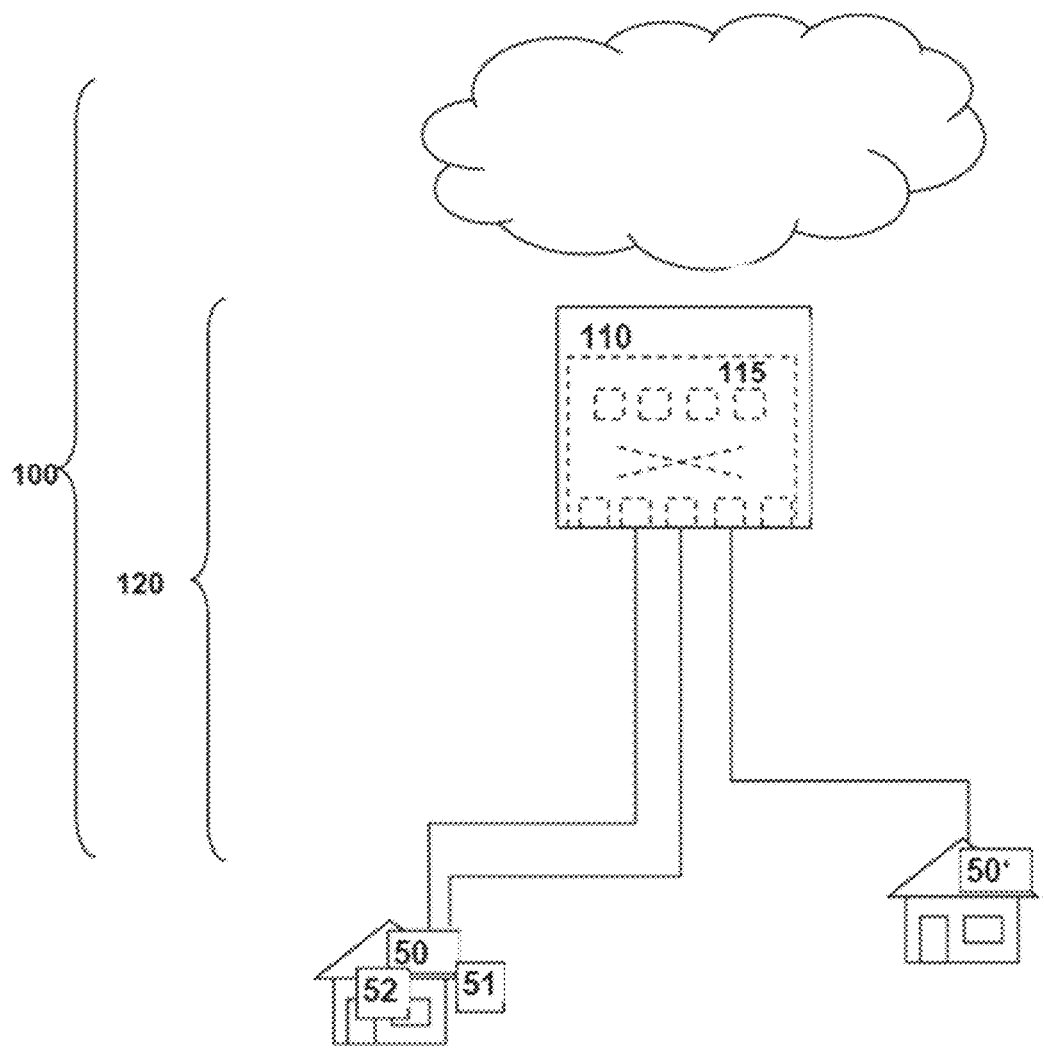
FIG. 1 schematically illustrates a telecommunications network according to the present invention, having a broadband access network with a central office point of delivery.

Exemplary embodiments of the present invention provide a technically simple, effective and cost effective solution for improved operation of a broadband access network of a telecommunications network and/or for improved and/or more energy efficient operation of the broadband access network, the broadband access network comprising a central office point of delivery with a switching fabric, the switching fabric comprising a plurality of spine network nodes and a plurality of leaf network nodes. Exemplary embodiments of the present invention further provide a corresponding broadband access network or telecommunications network, a corresponding spine network node or leaf network node or central power management entity or functionality or session management entity or functionality and a corresponding system for improved operation of a broadband access network and/or for improved and/or more energy efficient operation of the broadband access network.

In an exemplary embodiment, the present invention provides a method for improved operation of a broadband access network of a telecommunications network and/or for improved and/or more energy efficient operation of the broadband access network, the broadband access network comprising a central office point of delivery with a switching fabric, the switching fabric comprising a plurality of spine network nodes and a plurality of leaf network nodes, wherein the central office point of delivery and/or the broadband access network comprises a central power management entity or functionality and a session management entity or functionality, and wherein the plurality of spine network nodes and the plurality of leaf network nodes comprise, respectively, a local power management entity or functionality, wherein in order for improved and/or more energy efficient operation of the central office point of delivery, and regarding a considered leaf network node of the plurality of leaf network nodes, the method comprises the following steps:

in a first step, a traffic load information message regarding the current load situation of the considered leaf network node is transmitted, by the local power management entity or functionality of the considered leaf network node, to the central power management entity or functionality, in a second step, subsequent to the first step, the central power management entity or functionality transmits a session transfer request message to the session management entity or functionality, the session transfer request message corresponding to requesting permission to carry over one or a plurality of sessions handled by the considered leaf network node to another leaf network node of the plurality of leaf network nodes, in a third step, subsequent to the second step, the session management entity or functionality transmits a session transfer answer message to the central power management entity or functionality, the session transfer answer message corresponding to the session transfer request message, in a fourth step, subsequent to the third step, the central power management entity or functionality transmits a traffic load execution message to the local power management entity or functionality of the considered leaf network node, wherein, dependent on the content of the traffic load execution message, the considered leaf network node is controlled in order for an improved and/or more energy efficient operation.

It is thereby advantageously possible according to the present invention to provide a solution, especially using software defined network principles or technology, for determining and provisioning decisions, i.e. decisions relating to switching on or off components or network nodes of the broadband access network, especially the central office point of delivery. By requesting, if applicable, sessions—handled by a network node (especially a leaf network node hosting a service edge functionality) having a comparatively low load, and therefore being likely of being shut down (or transferred to a less power consuming state)—to be transferred in a controlled manner to another network node (especially another leaf network node hosting a service edge functionality), it is advantageously possible to control the powering up and down of network node in a manner dependent on ongoing or active sessions or communication links.

According to the present invention, the broadband access network typically comprises a central office point of delivery with a switching fabric, the switching fabric comprising a plurality of spine network nodes and a plurality of leaf network nodes. In addition to that, there are typically further servers or nodes (e.g., Kubernetes Master and Workers). Furthermore according to the present invention, the central office point of delivery and/or the broadband access network comprises a central power management entity or functionality and a session management entity or functionality, and the plurality of spine network nodes and the plurality of leaf network nodes comprise, respectively, a local power management entity or functionality. According to the present invention, in order for improved and/or more energy efficient operation of the central office point of delivery, and regarding a considered leaf network node of the plurality of leaf network nodes, the above mentioned steps (first to fourth step) are performed in order to control the considered leaf network node, especially regarding improved and/or more energy efficient operation.

According to the present invention, it is advantageously possible to provide for a centralized power management. Preferably, the centralized power management receives, from monitoring functions (LDF, load detection functions) internal to the central office point of delivery (i.e. within network nodes of the central office point of delivery), pieces of information or messages directed to the central office point of delivery centralized power management (MPC—Master Power Control, or central power management entity or functionality) which decides, dependent on traffic conditions, about shut down and/or restart procedures regarding network nodes. This is dependent on rules for traffic load (e.g. threshold below 40% of link capacity). Furthermore according to the present invention, it is advantageously possible to realize a centralized session state (within the session management entity or functionality) which is needed if sessions need to be handed over or transferred from one service edge node (or leaf network node) to a second service edge node (or leaf network node). According to the present invention, the centralized power management (MPC—Master Power Control, or central power management entity or functionality) is able to be realized either via a standalone function (i.e. realized in a separate hardware component or network node or entity) or in a manner integrated into an software defined network framework or technology (i.e. as part or as an instance (of, e.g., a virtual machine) on a server or network node being part of the central office point of delivery).

The telecommunications network according to the present invention may be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

Furthermore, it is advantageously possible and preferred according to the present invention that the considered leaf network node is controlled such that:
- one or a plurality of sessions previously handled by the considered leaf network node are carried over to another leaf network node of the plurality of leaf network nodes, and/or
- the considered leaf network node is switched off or switched to a stand-by state or switched to an energy-saving state, and/or
- one or a plurality of sessions previously handled by another leaf network node of the plurality of leaf network nodes are carried over to the considered leaf network node.

By controlling the considered leaf network node such that either one or a plurality of sessions previously handled by the considered leaf network node are carried over (or handed over) to another leaf network node of the plurality of leaf network nodes, and/or the considered leaf network node is switched off or switched to a stand-by state or switched to an energy-saving state, it is advantageously possible according to the present invention that the considered leaf network node can be powered down or powered off in a safe manner, i.e. without negatively interfering in the communication flow of ongoing or active communication sessions (especially end user communication sessions) handled by the considered leaf network node.

According to a further preferred embodiment of the present invention, the central office point of delivery and/or the broadband access network comprises a plurality of line termination nodes, wherein each one of the plurality of line termination nodes is connected to at least two leaf network nodes of the plurality of leaf network nodes.

By connecting at least a part (if not all) of the plurality of line termination nodes, respectively, to at least two leaf network nodes (instead of only one leaf network node) of the plurality of leaf network nodes, it is advantageously possible according to the present invention that, firstly, a single point of failure is avoided within the telecommunications network or within the broadband access network, and, secondly, it is advantageously possible to power off or power down one of the leaf network nodes to which the line termination nodes are, respectively, connected.

According to a further embodiment of the present invention, each one of the plurality of leaf network nodes is connected to at least two spine network nodes of the plurality of spine network nodes, wherein
- in a fifth step, a further traffic load information message regarding the current load situation of a considered spine network node is transmitted, by the local power management entity or functionality of the considered spine network node, to the central power management entity or functionality, and
- in a sixth step, subsequent to the fifth step, the central power management entity or functionality transmits a further traffic load execution message to the local power management entity or functionality of the considered spine network node, wherein, dependent on the content of the further traffic load execution message, the considered spine network node is controlled in order for improved and/or more energy efficient operation, especially, such that the considered spine network node is switched off or switched to a stand-by state or switched to an energy-saving state.

Thereby, it is advantageously possible to power down or power off a spine network node in a safe manner, i.e. without negatively interfering in the communication flow within the central office point of delivery or within the switching fabric.

Furthermore, according to a preferred embodiment of the present invention, the traffic load information message regarding the current load situation of the considered leaf network node and/or the further traffic load information message regarding the current load situation of a considered spine network node either corresponds to or is related to the actual load information, or to whether a predefined load threshold value is currently reached or not.

Thereby, it is advantageously possible to flexibly and efficiently adjust or adapt the communication between, on the one hand, the considered leaf network node or leaf network nodes and/or the considered spine network node or spine network nodes (i.e. rather the respective local power management entity or functionality within the respective leaf or spine network nodes), and, on the other hand, the central power management entity or functionality: This exchange of information or, rather, the flow of information from the respective local power management entity or functionality within the respective leaf or spine network nodes to the central power management entity or functionality might be only on demand (e.g. in case that the traffic load at one of the considered network nodes falls below a predetermined threshold value (of, say, 60% or 50% or 40% or 30% or 20% of peak performance capacity)), thereby advantageously reducing the overhead traffic devoted to this kind of communication, or this flow of information might be conducted almost continuously, such that the central power management entity or functionality is advantageously provided with ideally the complete picture (in a timely manner) of the load situation at or within different network nodes of the central office point of delivery or switching fabric.

According to a further embodiment of the present invention,
- the control, in order for improved and/or more energy efficient operation and dependent on the content of the traffic load execution message, of the considered leaf network node, and/or
- the control, in order for improved and/or more energy efficient operation and dependent on the content of the further traffic load execution message, of the considered spine network node comprises to apply different decision parameters, especially at least one threshold value and/or at least one time interval, in order to provide for a hysteresis behavior when switching off the considered leaf network node and/or the considered spine network node.

Thereby, it is advantageously possible allow for efficient, especially energy-efficient, yet stable operation of the telecommunications network and the broadband access network, especially the central office point of delivery. The goal of an utmost energy-efficiency would lead to powering down network nodes as quickly as at all possible (in case that load falls below certain load thresholds); however, such an operation might involve a reduced stability of operation of the system as an even slight increase in traffic load would trigger to provide additional capacity, hence to power up one or a plurality of network nodes. In order to avoid such an oscillating behavior, it is advantageously possible and preferred accord to the present invention to apply different decision parameters, especially at least one threshold value and/or at least one time interval, in order to provide for a hysteresis behavior when switching off network nodes (especially the considered leaf network node and/or the considered spine network) in order to avoid such oscillating behavior. The switching hysteresis should be determined by an adapted selection of the timing interval according to typical behavior of the system in the past; this also involves applying different threshold values and/or different time constants e.g. at different points in time (for example during a day or during a week or during a month). Especially, the historic data of traffic development might influence the switching hysteresis, especially with the aim to detect anomalies in traffic development and thus react more quickly, e.g. in an extreme situation: a disaster situation with sharply and quickly increasing traffic at night. Especially, there is generally a trade-off to be made between the goals of "power reduction" on the one hand, and higher availability and/or redundancy on the other hand. The decision thereon is typically part of a policy rule node or entity or functionality, typically located in the resource control and decision logic for the central office point of delivery; therein, it is possible to specify, e.g., that shutdown or power reduction might be possible only for a leaf network node, but not for a spine network node.

According to a further embodiment of the present invention, the central power management entity or functionality is part or realized within a central management switch of the broadband access network and/or of the central office point of delivery.

Thereby, it is advantageously possible to easily and effectively implement exemplary embodiments of the inventive method.

Furthermore, according to an embodiment of the present invention, the local power management entity or functionality within each of the plurality of spine network nodes and each of the plurality of leaf network nodes comprise or interacts with a respective load detection function, likewise being part of the plurality of spine network nodes and the plurality of leaf network nodes, respectively.

Thereby, it is advantageously possible to efficiently detect the relevant traffic load situations and conditions, and to communicate or propagate respective pieces of information or messages towards the central power management entity or functionality.

Furthermore, the present invention relates to a broadband access network or telecommunications network for improved operation of a broadband access network and/or for improved and/or more energy efficient operation of the broadband access network, the broadband access network comprising a central office point of delivery with a switching fabric, the switching fabric comprising a plurality of spine network nodes and a plurality of leaf network nodes, wherein the central office point of delivery and/or the broadband access network comprises a central power management entity or functionality and a session management entity or functionality, and wherein the plurality of spine network nodes and the plurality of leaf network nodes comprise, respectively, a local power management entity or functionality, wherein in order for improved and/or more energy efficient operation of the central office point of delivery, and regarding a considered leaf network node of the plurality of leaf network nodes, the broadband access network and/or the telecommunications network is configured such that:

a traffic load information message regarding the current load situation of the considered leaf network node is transmitted, by the local power management entity or functionality of the considered leaf network node, to the central power management entity or functionality, the central power management entity or functionality transmits a session transfer request message to the session management entity or functionality, the session transfer request message corresponding to requesting permission to carry over one or a plurality of sessions handled by the considered leaf network node to another leaf network node of the plurality of leaf network nodes, the session management entity or functionality transmits a session transfer answer message to the central power management entity or functionality, the session transfer answer message corresponding to the session transfer request message, the central power management entity or functionality transmits a traffic load execution message to the local power management entity or functionality of the considered leaf network node, wherein, dependent on the content of the traffic load execution message, the considered leaf network node is controlled in order for an improved and/or more energy efficient operation.

Furthermore, the present invention relates to a spine network node or leaf network node or central power management entity or functionality or session management entity or functionality, for improved operation of a broadband access network of a telecommunications network and/or for improved and/or more energy efficient operation of exemplary embodiments of the inventive broadband access network or exemplary embodiments of the inventive telecommunications network.

Additionally, the present invention relates to a system for improved operation of a broadband access network and/or for improved and/or more energy efficient operation of the broadband access network, the broadband access network comprising a central office point of delivery with a switching fabric, the switching fabric comprising a plurality of spine network nodes and a plurality of leaf network nodes, wherein the central office point of delivery and/or the broadband access network comprises a central power management entity or functionality and a session management entity or functionality, and wherein the plurality of spine network nodes and the plurality of leaf network nodes comprise, respectively, a local power management entity or functionality, wherein in order for improved and/or more energy efficient operation of the central office point of delivery, and regarding a considered leaf network node of the plurality of leaf network nodes, the system is configured such that:

a traffic load information message regarding the current load situation of the considered leaf network node is transmitted, by the local power management entity or functionality of the considered leaf network node, to the central power management entity or functionality, the central power management entity or functionality transmits a session transfer request message to the session management entity or functionality, the session transfer request message corresponding to requesting permission to carry over one or a plurality of sessions handled by the considered leaf network node to another leaf network node of the plurality of leaf network nodes, the session management entity or functionality transmits a session transfer answer message to the central power management entity or functionality, the session transfer answer message corresponding to the session transfer request message, the central power management entity or functionality transmits a traffic load execution message to the local power management entity or functionality of the considered leaf network node, wherein, dependent on the content of the traffic load execution message, the considered leaf network node is controlled in order for improved and/or more energy efficient operation.

Still additionally, the present invention relates to a program comprising a computer readable program code which, when executed on a computer and/or on a network node of a switching fabric or on a central power management entity or on a session management entity, or in part on the network node of a switching fabric and/or in part on the central power management entity and/or in part on a session management entity, causes the computer and/or the network node of a switching fabric or the central power management entity or the session management entity to perform an exemplary embodiment of the inventive method.

Furthermore, the present invention relates to a computer-readable medium comprising instructions which when executed on a computer and/or on a network node of a switching fabric or on a central power management entity or on a session management entity, or in part on the network node of a switching fabric and/or in part on the central power management entity and/or in part on a session management entity, causes the computer and/or the network node of a switching fabric or the central power management entity or the session management entity to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part might be present as well, as part of the telecommunications network 100, but is not specifically illustrated in FIG. 1. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

FIG. 2 schematically shows in greater detail the central office point of delivery 110 as part of a broadband access network 120 of a telecommunications network 100, the central office point of delivery 110 comprising a certain number of components, entities and/or network nodes, as well as further entities and/or network nodes being connected thereto. The represented part of the telecommunications network 100 comprises a switching fabric 115 comprising a plurality of spine network nodes 171, 172 and typically also a plurality of leaf network nodes 161, 162. In the exemplary representation of the telecommunications network 100, the leaf network nodes 161, 162 typically comprise or host the functionality of service edge nodes or entities; hence standalone service edge nodes are not represented and designated by reference signs in FIG. 2. Additionally, FIG. 2 shows a plurality of access nodes 151, 152; examples of such access nodes 151, 152 include line termination nodes, wherein, typically, each of the line termination nodes 151, 152 has one or a plurality of access node ports. The line termination nodes 151, 152 or access nodes 151, 152 might be provided to support different access technologies (e.g. DSL, digital subscriber line technologies, or line termination nodes supporting to be connected to an optical network, especially a passive optical network (PON), typically a so-called optical line terminal (OLT) or optical line terminal device) to a home gateway or customer premises equipment 50, 50' (represented in FIG. 1 but not in FIG. 2). In such a situation, a client device 51 is connected to the telecommunications network 100 (i.e. to the access node 151, 152) via the customer premises equipment 50 (or home gateway device 50, cf. FIG. 1), and, if applicable, a network termination node. The functionality of the customer premises equipment 50 (or home gateway device 50, cf. FIG. 1) and the functionality of the network termination node might also be integrated in one device or "box". Even the functionality of the client device 51, the functionality of the customer premises equipment 50 (or home gateway device 50) and the functionality of the network termination node might be integrated in one device or "box". In addition to the switching fabric 115, the central office point of delivery 110 also comprises the central power management entity or functionality 180, a central management switch 182 (or bottom-of-rack switch 182) and a plurality of servers or Kubernetes Master and Worker entities 165.

According to the present invention, a method for improved operation of a broadband access network 120 of a telecommunications network 100 and/or for improved and/or more energy efficient operation of the broadband access network 120 is provided. The broadband access network 120 comprises the central office point of delivery 110 with the switching fabric 115, the switching fabric 115 comprising the plurality of spine network nodes 171, 172 and the plurality of leaf network nodes 161, 162, and the central office point of delivery 110 and/or the broadband access network 120 comprises the central power management entity or functionality 180 as well as a session management entity or functionality 190.

According to the present invention, the plurality of spine network nodes 171, 172 and the plurality of leaf network nodes 161, 162 comprise, respectively, a local power management entity or functionality 171', 172', 161', 162'. Additionally to the respective local power management entity or functionality 171', 172', 161', 162', the spine network nodes 171, 172 and the leaf network nodes 161, 162 might additionally comprise, respectively, load detection functions or a load detection functionality. Likewise, the plurality of servers or Kubernetes Master and Worker entities 165 typically comprise, respectively, a local power management entity or functionality 165'.

Figure 4:
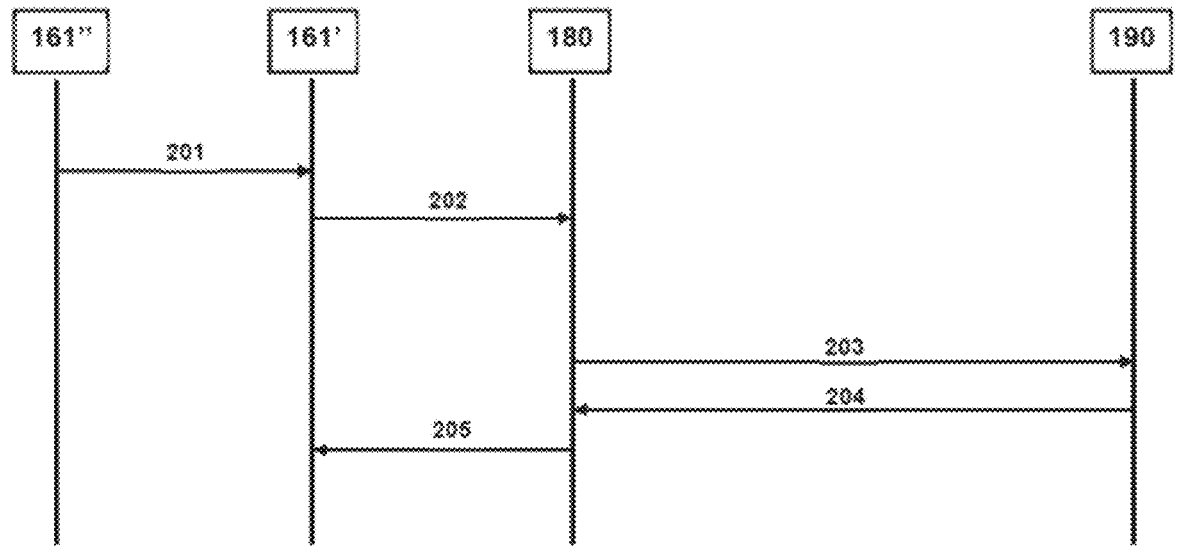

In FIG. 4 a communication diagram implementing the control of the respective entity or network node, in this case represented the considered leaf network node 161, is schematically shown. The communication diagram represented in FIG. 4 shows an example of a communication between the load detection functionality 161" of the considered leaf network node 161, the local power management entity or functionality 161' of the considered leaf network node 161, the central power management entity or functionality 180 as well as the session management entity or functionality 190. In a first processing step 201, threshold information is transmitted, by the load detection functionality 161" of the considered leaf network node 161, to or towards the local power management entity or functionality 161' of the considered leaf network node 161. FIG. 4 also shows the different steps according to the present invention: In order for improved and/or more energy efficient operation of the central office point of delivery 110, and regarding the considered leaf network node 161 (i.e. the "first" leaf network node 161) of the plurality of leaf network nodes 161, 162, the method according to the present invention comprises the following steps:

in a first step, a traffic load information message regarding the current load situation of the considered leaf network node 161 is transmitted, by the local power management entity or functionality 161' of the considered leaf network node 161, to the central power management entity or functionality 180 (this is represented, in FIG. 4, via a second processing step 202), in a second step, subsequent to the first step, the central power management entity or functionality 180 transmits a session transfer request message to the session management entity or functionality 190, the session transfer request message (or session carry over request message) corresponding to requesting permission to carry over one or a plurality of sessions handled by the considered leaf network node 161 to another leaf network node of the plurality of leaf network nodes 161, 162 (this is represented, in FIG. 4, via a third processing step 203), in a third step, subsequent to the second step, the session management entity or functionality 190 transmits a session transfer answer message to the central power management entity or functionality 180, the session transfer answer message corresponding to the session transfer request message (this is represented, in FIG. 4, via a fourth processing step 204), in a fourth step, subsequent to the third step, the central power management entity or functionality 180 transmits a traffic load execution message to the local power management entity or functionality 161' of the considered leaf network node 161 (this is represented, in FIG. 4, via a fifth processing step 205), wherein, dependent on the content of the traffic load execution message, the considered leaf network node 161 is controlled in order for an improved and/or more energy efficient operation, typically by powering the considered leaf network node 161 off or switching this network node to a state corresponding to a lower power consumption. The session transfer request message might refer, e.g., to an access session (of a client device such as a user equipment or the like), and/or to an IP session, and/or to a voice session. By requesting, if applicable, sessions—handled by a network node (especially a leaf network node hosting a service edge functionality) having a comparatively low load, and therefore being likely of being shut down (or transferred to a less power consuming state)—to be transferred in a controlled manner to another network node (especially another leaf network node hosting a service edge functionality), it is advantageously possible to control the powering up and down of network node in a manner dependent on ongoing or active sessions or communication links.

In FIG. 3, a block or flow diagram implementing the control of the respective entity or network node, especially the considered leaf network node 161 or spine network node 171 is schematically shown. The local power management entities or functionalities 171', 172', 161', 162', 165' (of the respective leaf network nodes 161, 162, or the respective spine network nodes 171, 172, or the respective servers or Kubernetes Master and Worker entities 165) provide information or messages (corresponding, in case of the considered leaf network node 161, to the traffic load information message regarding the current load situation of the considered leaf network node 161, but corresponding to analogous traffic load information messages regarding other network nodes) to the central power management entity or functionality 180. Within or as part of the central power management entity or functionality 180, a load information collection entity or part 183 is provided, collecting the load information (or the traffic load information messages from the respective network nodes 161, 162, 171, 172, 165). This collected information is processed by a processing entity or part 184, and provided (or the processing result provided) to a central office point of delivery resource control and/or decision entity or part 185. Decisions taken by the central office point of delivery resource control and/or decision entity or part 185 are informed, if applicable (and especially in case that ongoing communication sessions or active (user) communication links might need to be transferred, i.e. especially in case of decisions regarding leaf network nodes 161 hosting service edge functionalities), by information requested—by the central power management entity or functionality 180—from the session management entity or functionality 190. From the central office point of delivery resource control and/or decision entity or part 185, corresponding control or command information, is transmitted to a network and service preparation entity or part 186, and from there forwarded to an execution entity or part 187, providing traffic load execution messages to the respective local power management entities or functionalities 171', 172', 161', 162', 165' (of the respective leaf network nodes 161, 162, or the respective spine network nodes 171, 172, or the respective servers or Kubernetes Master and Worker entities 165). The network and service preparation entity or part 186 also transmits information to a software defined network controller 189.

According to the present invention, the service edge functionality resides typically (but not necessarily) on the leaf network nodes 161, 162, and terminates retail customers. The routing towards the IP core (represented in FIG. 2 via a cloud representation) resides on the spine network nodes 171, 172. The components inside the central office point of delivery 110 are typically connected via a bottom-of-rack switch for the network and device management. It is preferred according to the present invention that the access nodes 151, 152 are connected "dual homed" (i.e. with redundancy) to the leaf network nodes and/or to the service edge network nodes. Each network node typically has a local power management entity or functionality 171', 172', 161', 162', 165' (also called SPC-function, Slave Power Control) to request to the mater power controller (or central power management entity or functionality 180) and to receive execution requests from there.

Advantageously according to the present invention, the access nodes 151, 152 have or apply a load balancing function (LBF) in order to distribute traffic on dual homed links (i.e. each of the access nodes 151, 152 is connected to two (or more) leaf network nodes 161, 162). The load balancing function (that might be separated or included or integrated with the traffic or load detection function) resides on the leaf network nodes 161, 162 (or the service edge network nodes) and reports traffic load information to the central power management entity or functionality 180 (Master POD Power Control, MPC); this information can either be the actual load information (then the calculation is done centrally at MPC level), or it can be an information about the load being under or above a predefined threshold. Based on this information, the central power management entity or functionality 180 or MPC processes these data, requests the POD resource control and requests the session management entity or functionality 190 (SMF, session management function) to inform about the expected session hand over from a considered service edge node or considered leaf network node being expected to be shut down to carry over sessions to another service edge node or leaf network node. After commitment by the session management entity or functionality 190, the central power management entity or functionality 180, MPC, requests the considered leaf network node 161 (or service edge network node) to reduce power or to shut down.

If traffic conditions expect higher load than previously, the considered and previously shut down (or powered down) leaf network node 161 (or service edge network node) will be activated again. Providing a hysteresis behavior should avoid a severe oscillating behavior or toggling of such network nodes (i.e. especially leaf network nodes 161, 162, service edge network nodes, spine network nodes 171, 172 or servers or Kubernetes Master and Worker entities 165) between the operating states of being shut down and being powered up. Therefore, the above mentioned timing interval (prior to which a powering down decision is actually implemented or executed) should be sufficient long. In case of shut down or powering down of spine network nodes 171, 172, routing tables are ported prior to a handover of active communication sessions; however the same timing considerations also apply here. The same considerations apply also in case of a shutdown (or powering down) of servers or Kubernetes Master and Worker entities 165 within the server cluster: each server hosts a Kubernetes master and worker node which enables a shutdown (or powering down) of two out of three servers.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:
1. A telecommunications system, comprising:
a core network;
a broadband access network comprising a central office point of delivery and a plurality of line termination nodes;
wherein the central office point of delivery is located between the core network and a customer's premises, and wherein the central office point of delivery is connected to the customer's premises via a first line termination node of the plurality of line termination nodes;
wherein the central office point of delivery comprises a switching fabric, wherein the switching fabric comprises a plurality of spine network nodes and a plurality of leaf network nodes, wherein the plurality of spine network nodes are configured to route traffic from the customer's premises towards the core network;
wherein the broadband access network comprises a central power management entity or functionality and a session management entity or functionality;
wherein the first line termination node is connected via dual-homed links to both a first leaf network node and a second leaf network node of the plurality of leaf network nodes, wherein the first leaf network node is configured to host a first service edge functionality terminating a first connection between the first leaf network node and the first line termination node, and the second leaf network node is configured to host a second service edge functionality terminating a second connection between the second leaf network node and the first line termination node;

wherein the first leaf network node is configured to transmit a traffic load information message regarding a current load situation of the first leaf network node to the central power management entity or functionality;

wherein the central power management entity or functionality is configured to transmit a session transfer request message to the session management entity or functionality, wherein the session transfer request message corresponds to requesting permission to carry over one or more sessions handled by the first leaf network node to the second leaf network node;

wherein the session management entity or functionality is configured to transmit a session transfer answer message to the central power management entity or functionality, wherein the session transfer answer message corresponds to the session transfer request message, and wherein the first leaf network node is configured to be controlled such that one or more sessions previously handled by the first leaf network node are carried over to the second leaf network node; and wherein the central power management entity or functionality is configured to transmit a traffic load execution message to the first leaf network node, wherein the traffic load execution message is for controlling the first leaf network node such that the first leaf network node is switched off or switched to a stand-by state or switched to an energy-saving state.

2. The system according to claim 1, wherein the first leaf network node is further configured to be controlled such that:
one or more sessions previously handled by the second leaf network node are carried over to the first leaf network node.

3. The system according to claim 1, wherein each one of the plurality of line termination nodes is connected to at least two leaf network nodes of the plurality of leaf network nodes.

4. The system according to claim 1, wherein each one of the plurality of leaf network nodes is connected to at least two spine network nodes of the plurality of spine network nodes;
wherein the first spine network node is configured to transmit a further traffic load information message regarding a current load situation of a first spine network node to the central power management entity or functionality; and
wherein the central power management entity or functionality is configured to transmit a further traffic load execution message to the local power management entity or functionality of the first spine network node, wherein the further traffic load execution message is for controlling the first spine network node such that the first spine network node is switched off or switched to a stand-by state or switched to an energy-saving state.

5. The system according to claim 4, wherein the traffic load information message regarding the current load situation of the first leaf network node and/or the further traffic load information message regarding the current load situation of the first spine network node is related to actual load information or to whether or not a predefined load threshold value is currently reached.

6. The system according to claim 4, wherein controlling the first leaf network node and/or the first spine network node comprises applying different decision parameters, wherein the different decision parameters include at least one threshold value and/or at least one time interval, in order to provide for a hysteresis behavior when switching off the first leaf network node and/or the first spine network node.

7. The system according to claim 1, wherein the central power management entity or functionality is part of or realized within a central management switch of the broadband access network.

8. The system according to claim 1, wherein each of the plurality of spine network nodes and each of the plurality of leaf network nodes is configured for load detection.

9. A method for operation of a telecommunications network, comprising:
transmitting, by a first leaf network node of a plurality of leaf network nodes of a switching fabric of a central office point of delivery of a broadband access network of the telecommunications network, a traffic load information message regarding a current load situation of the first leaf network node to a central power management entity or functionality of a central office point of delivery;

transmitting, by the central power management entity or functionality, a session transfer request message to a session management entity or functionality of the central office point of delivery, wherein the session transfer request message corresponds to requesting permission to carry over one or more sessions handled by the first leaf network node to a second leaf network node of the plurality of leaf network nodes;

transmitting, by the session management entity or functionality, a session transfer answer message to the central power management entity or functionality, wherein the session transfer answer message corresponds to the session transfer request message, and wherein the first leaf network node is controlled such that one or more sessions previously handled by the first leaf network node are carried over to the second leaf network node; and transmitting, by the central power management entity or functionality, a traffic load execution message to the first leaf network node, wherein the traffic load execution message is for controlling the first leaf network node such that the first leaf network node is switched off or switched to a stand-by state or switched to an energy-saving state;

wherein the central office point of delivery is located between a core network of the telecommunications network and a customer's premises, wherein the central office point of delivery is connected to the customer's premises via a first line termination node of a plurality of line termination nodes of the broadband access network, and wherein the plurality of spine network nodes route traffic from the customer's premises towards the core network;

wherein the first line termination node is connected via dual-homed links to both the first leaf network node and the second leaf network node, wherein the first leaf network node hosts a first service edge functionality terminating a first connection between the first leaf network node and the first line termination node, and the second leaf network node hosts a second service edge functionality terminating a second connection between the second leaf network node and the first line termination node.

10. The method according to claim 9, wherein the first leaf network node is controlled such that:
one or more sessions previously handled by the second leaf network node are carried over to the first leaf network node.

11. The method according to claim 9, wherein each one of the plurality of line termination nodes is connected to at least two leaf network nodes of the plurality of leaf network nodes.

12. The method according to claim 9, wherein each one of the plurality of leaf network nodes is connected to at least two spine network nodes of the plurality of spine network nodes; and
wherein the method further comprises:
transmitting, by the first spine network node, a further traffic load information message regarding a current load situation of a first spine network node to the central power management entity or functionality; and
transmitting, by the central power management entity or functionality, a further traffic load execution message to the local power management entity or functionality of the first spine network node, wherein the further traffic load execution message is for controlling the first spine network node such that the first spine network node is switched off or switched to a stand-by state or switched to an energy-saving state.

13. The method according to claim 12, wherein the traffic load information message regarding the current load situation of the first leaf network node and/or the further traffic load information message regarding the current load situation of the first spine network node is related to actual load information or to whether or not a predefined load threshold value is currently reached.

14. The method according to claim 12, wherein controlling the first leaf network node and/or the first spine network node comprises applying different decision parameters, wherein the different decision parameters include at least one threshold value and/or at least one time interval, in order to provide for a hysteresis behavior when switching off the first leaf network node and/or the first spine network node.

15. The method according to claim 9, wherein the central power management entity or functionality is part of or realized within a central management switch of the broadband access network.

16. The method according to claim 9, wherein each of the plurality of spine network nodes and each of the plurality of leaf network nodes performs load detection.

17. One or more non-transitory computer-readable mediums having processor-executable instructions stored thereon for operation of a telecommunications network, wherein the processor-executable instructions, when executed, facilitate performance of the following:
transmitting, by a first leaf network node of a plurality of leaf network nodes of a switching fabric of a central office point of delivery of a broadband access network of the telecommunications network, a traffic load information message regarding a current load situation of the first leaf network node to a central power management entity or functionality of a central office point of delivery;
transmitting, by the central power management entity or functionality, a session transfer request message to a session management entity or functionality of the central office point of delivery, wherein the session transfer request message corresponds to requesting permission to carry over one or more sessions handled by the first leaf network node to a second leaf network node of the plurality of leaf network nodes;
transmitting, by the session management entity or functionality, a session transfer answer message to the central power management entity or functionality, wherein the session transfer answer message corresponds to the session transfer request message, and wherein the first leaf network node is controlled such that one or more sessions previously handled by the first leaf network node are carried over to the second leaf network node; and
transmitting, by the central power management entity or functionality, a traffic load execution message to the first leaf network node, wherein the traffic load execution message is for controlling the first leaf network node such that the first leaf network node is switched off or switched to a stand-by state or switched to an energy-saving state;
wherein the central office point of delivery is located between a core network of the telecommunications network and a customer's premises, wherein the central office point of delivery is connected to the customer's premises via a first line termination node of a plurality of line termination nodes of the broadband access network, and wherein the plurality of spine network nodes route traffic from the customer's premises towards the core network;
wherein the first line termination node is connected via dual-homed links to both the first leaf network node and the second leaf network node, wherein the first leaf network node hosts a first service edge functionality terminating a first connection between the first leaf network node and the first line termination node, and the second leaf network node hosts a second service edge functionality terminating a second connection between the second leaf network node and the first line termination node.

* * * * *